United States Patent [19]

Field

[11] Patent Number: 4,635,537
[45] Date of Patent: Jan. 13, 1987

[54] FUEL PRESSURE REGULATOR
[75] Inventor: Martin J. Field, Churchville, N.Y.
[73] Assignee: General Motors Corporation, Detroit, Mich.
[21] Appl. No.: 821,031
[22] Filed: Jan. 21, 1986

Related U.S. Application Data

[63] Continuation of Ser. No. 622,954, Jun. 21, 1984, abandoned.

[51] Int. Cl.$^4$ ................................................. F16J 3/02
[52] U.S. Cl. ..................................... 92/98 R; 137/510
[58] Field of Search ............. 137/510; 92/98 R, 98 D, 92/99; 220/79

[56] References Cited

U.S. PATENT DOCUMENTS

| | | | |
|---|---|---|---|
| 1,285,493 | 11/1918 | Wallace et al. | 137/510 |
| 2,600,731 | 6/1952 | Carlton et al. | 137/510 |
| 3,511,270 | 5/1970 | Fehrenbach et al. | 137/510 |
| 3,746,036 | 7/1973 | DuBois et al. | 137/510 X |
| 4,204,561 | 5/1980 | Ludwig | 137/510 |
| 4,327,767 | 5/1982 | Fehrenbach et al. | 137/510 |

FOREIGN PATENT DOCUMENTS

| | | | |
|---|---|---|---|
| 169253 | 5/1934 | Switzerland | 137/510 |
| 744889 | 2/1956 | United Kingdom | 92/98 R |

Primary Examiner—Robert E. Garrett
Assistant Examiner—Mark A. Williamson
Attorney, Agent, or Firm—C. K. Veenstra

[57] ABSTRACT

A pressure regulator base has a rim staked over the flange of a pressure regulator cover, and a compression ring concentrates the clamping effort of the cover on a circular area of the pressure regulator diaphragm sealing region.

2 Claims, 4 Drawing Figures

U.S. Patent   Jan. 13, 1987   4,635,537
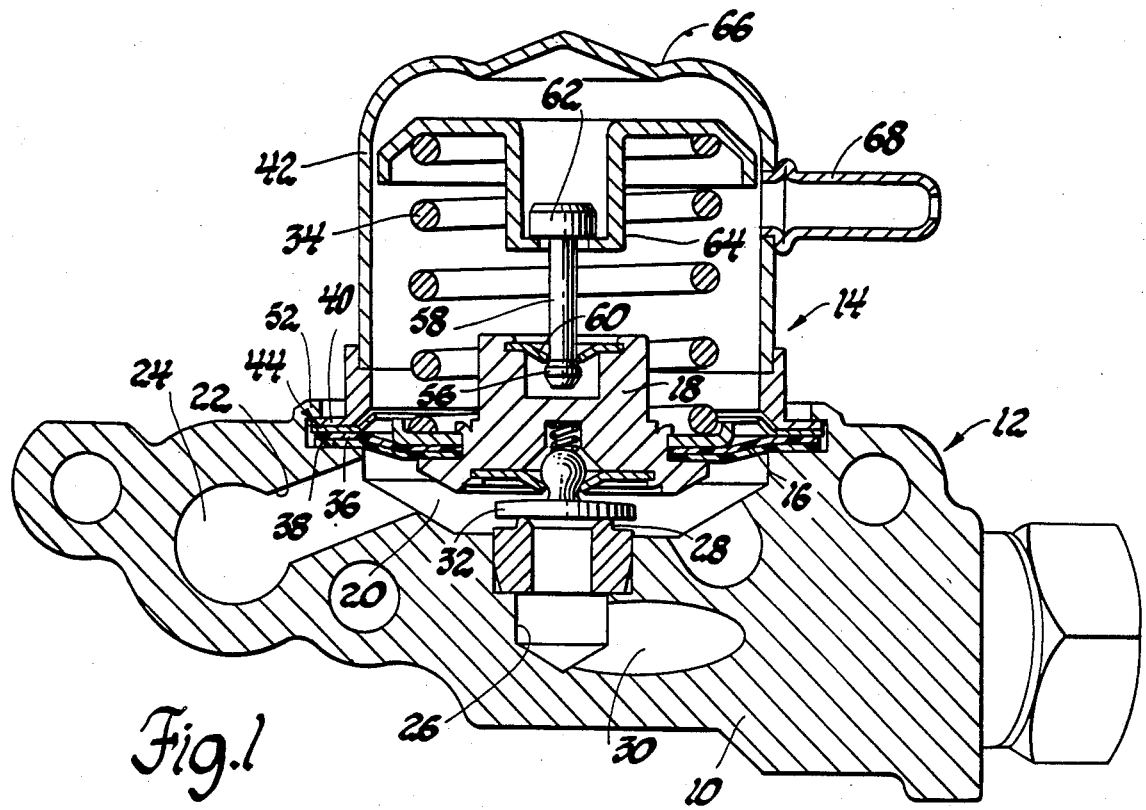
*Fig.1*
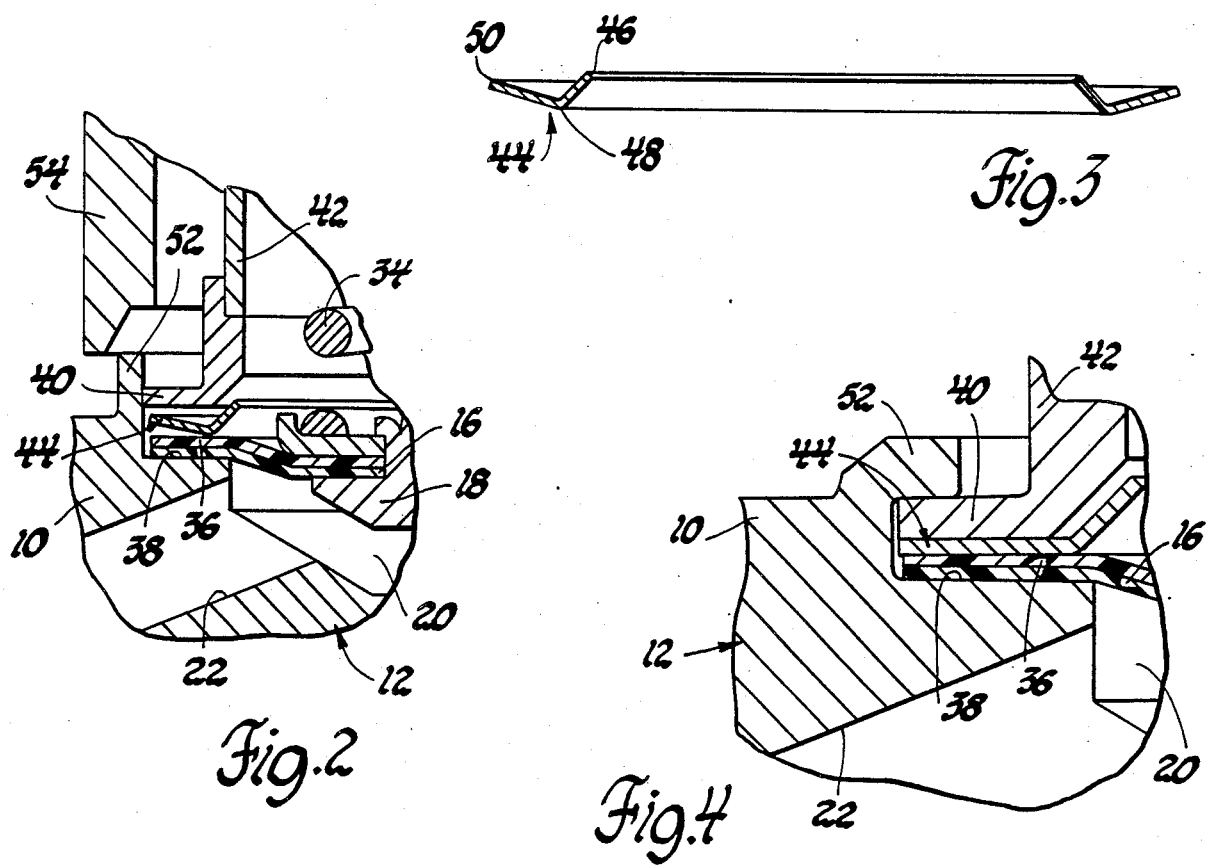
*Fig.2*   *Fig.3*   *Fig.4*

FUEL PRESSURE REGULATOR

This is a continuation of application Ser. No. 622,954 filed on June 21, 1984, now abandoned.

TECHNICAL FIELD

This invention relates to a fuel pressure regulator employed in fuel injection apparatus.

BACKGROUND

Some fuel injection systems for automotive engines have a plurality of fuel injectors each of which delivers fuel to the inlet port of an associated engine combustion chamber. In some such systems, the fuel injectors are mounted in sockets of a fuel rail which has a passage to supply fuel to the injectors; the fuel rail simplifies installation of the fuel injectors and the fuel supply passage on the engine.

In such systems, a pump supplies more fuel to the fuel supply passage than is required by the injectors, and the excess fuel is discharged through a fuel pressure regulator represented, for example, by U.S. Pat. No. 3511270. In some applications, the pressure regulator diaphragm is clamped between a sheet metal cover and a sheet metal base, and the base has a rim which is deformed over a flange of the cover to apply a clamping force to the cover and diaphragm. In other applications, the pressure regulator diaphragm is clamped between a sheet metal cover and a machined base, and screws are employed to clamp the cover and the diaphragm to the base.

SUMMARY OF THE INVENTION

This invention provides a fuel pressure regulator in which the pressure regulator diaphragm is clamped between a sheet metal cover and a machined base without employing screws to apply the clamping force.

In a pressure regulator according to this invention, a pressure regulator diaphragm is clamped between a cover and a base, a rim on the base is staked over a flange on the cover to apply a clamping force to the cover and the diaphragm, and a compression ring disposed between the cover and the diaphragm concentrates the clamping force on a circular area of the diaphragm.

The details as well as other features and advantages of a preferred embodiment of this invention are set forth in the remainder of the specification and are shown in the accompanying drawing.

SUMMARY OF THE DRAWING

FIG. 1 is a sectional view of a portion of a fuel rail including a pressure regulator constructed according to this invention.

FIG. 2 is an exploded view of a portion of the FIG. 1 pressure regulator.

FIG. 3 is a sectional view of the compression ring separated from the pressure regulator.

FIG. 4 is a view of a portion of the FIG. 1 pressure regulator enlarged to show details of construction.

THE PREFERRED EMBODIMENT

Referring to the drawing, the body 10 of an extruded fuel rail 12 is machined to form a base for a fuel pressure regulator 14. Pressure regulator 14 has a pair of diaphragms 16 which overlie one another to form a single diaphragm unit and which are clamped to and carry a central diaphragm retainer plate 18.

A fuel chamber 20 is formed between diaphragms 16 and base 10. Chamber 20 has a fuel access region 22 opening from a fuel supply passage 24 and a fuel outlet 26 opening through a valve seat 28 to a fuel return passage 30.

Diaphragm retainer plate 18 carries a valve member 32 which cooperates with valve seat 28, and a spring 34 biases diaphragms 16 to engage valve member 32 with valve seat 28. Pressure regulator 14 controls fuel flow past valve seat 28 to balance the fuel pressure in chamber 20 on diaphragms 16 with the bias of spring 34 to thereby maintain a substantially constant fuel pressure in chamber 20 and thus in fuel supply passage 24.

Diaphragms 16 have an annular sealing region 36 disposed between an annular clamping surface 38 formed in body 10 and an annular flange 40 of a cover 42. A compression ring 44 is sandwiched between flange 40 and diaphragm sealing region 36. Compression ring 44 has a free inner edge 46, a circular intermediate area 48 engaging diaphragm sealing region 36, and an outer edge 50 engaging flange 40. The inner edge 46 of sealing ring 44 is spaced both from diaphragms 16 and from cover 42.

Body 10 has a rim 52 surrounding and extending axially from clamping surface 38. Rim 52 is staked or deformed over flange 40—by the staking tool 54 shown in FIG. 2, for example—to cause flange 40 to clamp diaphragm sealing region 36 against clamping surface 38. Flange 40 engages the outer edge 50 of compression ring 44, distorting compression ring 44 and causing compression ring 44 to concentrate the clamping effort of flange 40 in the intermediate area 48 of compression ring 44. Compression ring 44 is thus effective to concentrate the clamping effort of flange 40 on a circular area of the diaphragm sealing region 36.

The concentrated clamping effort assures a proper seal between diaphragm sealing region 36 and clamping surface 38. Compression ring 44 is also effective to maintain the clamping effort in the event that the staking force of rim 52 relaxes in the course of time.

A bead 56 on a tie rod 58 is captured by a ring 60 secured to diaphragm retainer plate 18, and the head 62 of tie rod 58 is captured behind a spring seat 64. Tie rod 58 thus limits movement of spring seat 64 away from diaphragm retainer plate 18 to simplify assembly of pressure regulator 14.

The end 66 of cover 42 overlies spring seat 64 and is axially deformable to move spring seat 64 away from tie rod head 62 toward diaphragm retainer plate 18; spring 34 is thereby compressed to increase the bias on diaphragms 16 and thus increase the fuel pressure in chamber 20 and supply passage 24.

A hose is connected between a fitting 68 on cover 42 and the engine induction system to vent the interior of cover 42.

Features of the pressure regulator depicted here were invented by T. J. Atkins and M. J. Field as claimed in U.S. Pat. No. 4,436,112.

The embodiments of the invention in which an exclusive property or privilege is claimed are defined as follows:

1. A fuel pressure regulator comprising a pressure regulator base having an annular clamping surface, a pressure regulator diaphragm having an annular sealing region overlying said clamping surface, a cover having an annular flange overlying said sealing region, said base having a rim surrounding and extending axially from said clamping surface, said rim being staked over said flange to cause said flange to clamp said diaphragm sealing region against said base clamping surface, and an annular compression ring disposed between said flange and said diaphragm sealing region, said compression ring being substantially V-shaped in cross-section to define an inner edge spaced from said diaphragm, a circular intermediate area engaging a circular area of said diaphragm sealing region, and an outer edge engaging said flange, said outer edge being axially displaced from said intermediate area in the free state of said compression ring, said compression ring thereby being effective to concentrate the clamping effort of said flange on said circular area of said diaphragm sealing region.

2. A fuel pressure regulator comprising a pressure regulator base having an annular clamping surface, a pressure regulator diaphragm having an annular sealing region overlying said clamping surface, a cover having an annular flange overlying said sealing region, said base having a rim surrounding and extending axially from said clamping surface, said rim being staked over said flange to cause said flange to clamp said diaphragm sealing region against said base clamping surface, and an annular compression ring disposed between said flange and said diaphragm sealing region, said compression ring being substantially V-shaped in cross-section to define a free inner edge spaced from said diaphragm and said cover, a circular intermediate area engaging a circular area of said diaphragm sealing region, and an outer edge engaging said flange, said outer edge being axially displaced from said intermediate area in the free state of said compression ring, said compression ring thereby being effective to concentrate the clamping effort of said flange on said circular area of said diaphragm sealing region.

* * * * *